(12) United States Patent
Dave et al.

(10) Patent No.: US 11,873,402 B2
(45) Date of Patent: Jan. 16, 2024

(54) ENHANCED SUFFUSION COATED AND LAMINATED NYLON FIBERS

(71) Applicant: Shakespeare Company, LLC, Greer, SC (US)

(72) Inventors: Piyush Dave, Elgin, SC (US); Saumitra Bhargava, Clarksville, MD (US)

(73) Assignee: SHAKESPEARE COMPANY, LLC, Greer, SC (US)

( * ) Notice: Subject to any disclaimer, the term of this patent is extended or adjusted under 35 U.S.C. 154(b) by 66 days.

(21) Appl. No.: 17/656,798

(22) Filed: Mar. 28, 2022

(65) Prior Publication Data

US 2023/0323118 A1 Oct. 12, 2023

(51) Int. Cl.
   *C08L 77/06* (2006.01)

(52) U.S. Cl.
   CPC ......... *C08L 77/06* (2013.01); *C08L 2205/025* (2013.01)

(58) Field of Classification Search
   CPC ..... B32B 2262/0261; B32B 2262/0269; C08L 2205/02; C08L 2205/025; C08L 2205/16; C08L 2666/55; C08L 2666/86; C08L 2201/04; C08L 2203/20
   See application file for complete search history.

(56) References Cited

U.S. PATENT DOCUMENTS

| | | | |
|---|---|---|---|
| 3,823,035 A | 7/1974 | Sanders | |
| 4,255,487 A | 3/1981 | Sanders | |
| 4,704,311 A | 11/1987 | Pickering et al. | |
| 4,803,096 A | 2/1989 | Kuhn et al. | |
| 7,825,174 B2 | 11/2010 | Berndt et al. | |
| 9,834,868 B2 | 12/2017 | Bhargava | |
| 10,023,978 B2 | 7/2018 | Bhargava | |
| 10,053,799 B2 | 8/2018 | Bhargava | |
| 10,280,533 B2 | 5/2019 | Bhargava | |
| 2017/0009384 A1* | 1/2017 | Bhargava | C08L 77/02 |
| 2017/0191192 A1* | 7/2017 | Bhargava | D01F 6/90 |

OTHER PUBLICATIONS

"AntiStat Product information", Perlon—The Filament Company, <https://www.perlon.com/wp-content/uploads/2019/05/PER_PB_AntiStat_19_en_web.pdf> (Accessed Apr. 1, 2022).

* cited by examiner

*Primary Examiner* — Ana L. Woodward
(74) *Attorney, Agent, or Firm* — Eversheds Sutherland (US) LLP

(57) ABSTRACT

Enhanced suffusion coated and laminated nylon fibers are described. The fibers are formed from a blend of an aliphatic nylon and a semiaromatic nylon that is subsequently suffused with carbon. The nylon blend demonstrates advantageous physical properties over typical nylons, and the carbon suffusion process unexpectedly improved these physical properties further.

12 Claims, 1 Drawing Sheet

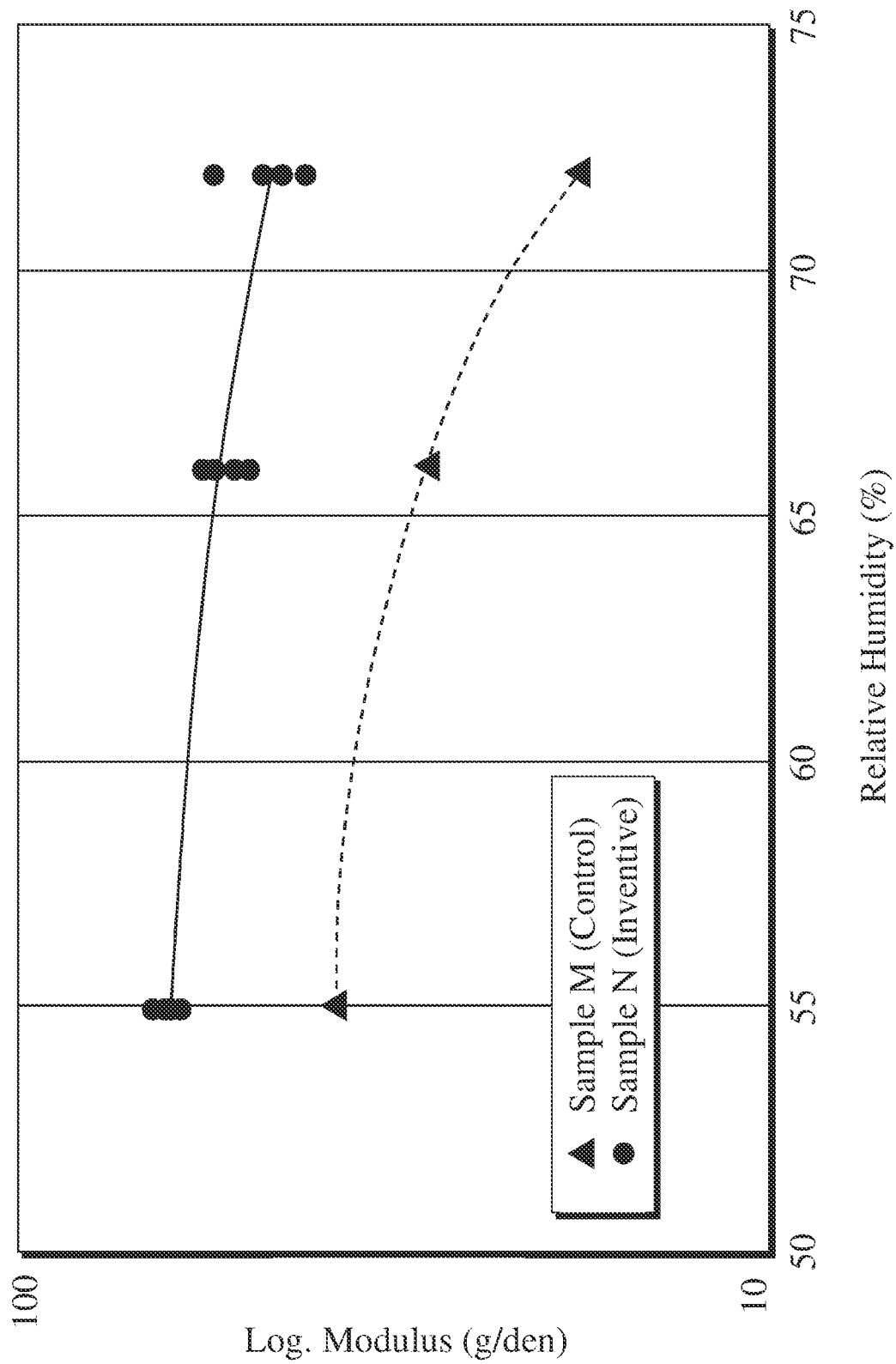

ENHANCED SUFFUSION COATED AND LAMINATED NYLON FIBERS

FIELD OF THE DISCLOSURE

This disclosure relates generally to a filament made from a polymer blend and methods of making filaments from a polymer blend and, in particular, relates to carbon suffused filaments fibers and methods of making carbon suffused filaments.

BACKGROUND

Conductive fibers have multiple crucial applications such as static-dissipation in carpets, static-sensitive commercial and industrial environments such as electronic manufacturing, clean room environments, refineries, and flammable chemical and powder handling. Several of these static-sensitive applications are required to use conductive fibers by various regulatory bodies.

Moving/conveying belts made with polymeric materials such as woven fabrics generate static during use, which results in in variability in performance. For example, a powder being laid on fabric belt often shows variability in both powder spread and powder thickness depending on the degree of static generation. Incorporating conductive fibers into the belt eliminates static, resulting in a more uniform distribution of powder on a fabric belt.

In e-textile or smart clothing applications, conductive fibers are desired to add electrical sensing for continuous environmental monitoring, such as body temperature and sweat, or to measure and record body and/or limb movement. Medical companies seek to add sensors to clothing for continuous electrocardiogram (ECG), electromyography (EMG), and electroencephalography (EEG). Apparel- and fabric-related applications require that conductive fibers be capable of being knitted or woven in the fabrics. Further, they must show negligible performance deterioration in commercial laundering or cleaning.

In typical fabric construction, conductive filaments are present in a ratio from 1:20 to 1:256. Conductive fibers such as metal wires braided within yarn or yarn with metal coatings often suffer from longevity of use as they fail due to brittleness and their inability to deform with the fiber matrix. Conductive fibers such as polymeric fibers with a conductive component suffer from low modulus which leads to increased deformation in the fabric matrix and deterioration over the life of the apparel. Thus, a conductive fiber with a tenacity and modulus closer to that of the fibers with a fabric structure is needed to improve interfacing with the fabric structure and to add electrical and sensing features without affecting the fabric's original properties. Further, wearable sensors must maintain their sensing capabilities under the demands of normal wear, which can impose severe mechanical deformation of the apparel.

Commercially available conductive filament have tenacity which is 35-50% lower than the matrix. This leads to the conductive filament failing or breaking before the useful life of the fabric. Coated metal conductive filaments or metal filaments fail due to their inability to bend as their modulus and stiffness exceeds that of matrix fibers.

Previous attempts to improve conductive fibers include suffusing carbon on nylon so that the nylon fibers have low to medium stiffness while imparting conductivity. Polyester-based conductive filaments exhibit low stiffness, despite being made with polyester, due to limits of manufacturing. Polyester-based conductive filaments also suffer from lower conductivity than the carbon-suffused nylon filaments. Furthermore, these polyester-based conductive filaments suffer from lower tenacity and result in plane differences when incorporated within polyester fabric structures. Attempts to increase the tenacity and stiffness of fibers by increasing fiber draw leads to a decrease in conductivity with a given type of conductive media. Thus, development of polymer based conductive filament has traditionally required balancing tenacity and conductivity.

When either carbon-suffused nylon or polyester-based conductive filaments are incorporated into woven or knitted fabric structures made from polyester or high stiffness fibers, they result in tenacity and modulus mismatch. Thus, these conductive filaments exhibit greater stretching during initial stresses. This in turn leads to differences in crimp in fabric or composite structures leading to out of plane crimp or knuckles which create localized wear points limiting life of fabric.

Accordingly, improved conductive filaments are needed for overcoming one or more of the technical challenges described above.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 1 is a graph of relative humidity versus the log of modulus, in accordance with the present invention.

DETAILED DESCRIPTION

Novel filaments are provided herein including novel filaments made from a nylon blend and specific articles comprised of the filament, such as that described in U.S. Pat. No. 9,834,868 to Shakespeare Company, LLC, which is hereby incorporated by reference. More precisely, in a preferred embodiment, the filament includes a nylon blend of an aliphatic nylon and a semiaromatic nylon, which is subsequently suffused with carbon, such as through the process described in U.S. Pat. No. 4,704,311 to Shakespeare Conductive Filaments, LLC, which is hereby incorporated by reference. Surprisingly, the novel fiber and filament described herein has enhanced physical, mechanical, and electrical conductive properties as compared to an aliphatic nylon filament, and these enhanced properties were unexpectedly retained and/or improved after the carbon suffusion process.

In some embodiments, the major component in the nylon blend is an aliphatic nylon and the minor component is a semiaromatic nylon. The aliphatic nylon may be Nylon 6, Nylon 66, copolymers rich in Nylon 6 or Nylon 66, and/or mixtures thereof. As used herein, "rich in" means "comprising in an amount of 90% by weight or more." The semi-aromatic nylon may be polyphthalamide composed of hexamethylene diamine, isophthalic acid, and terephthalic acid (6I/6T or 6T/6I), polyphthalamide composed of methylpentanediamine, terephthalic acid, and isophthalic acid (DT/DI), and/or mixtures thereof. In each case, the ratio of isophthalic acid/terephthalic acid is chosen so that the resulting material is amorphous or has a melting temperature below that of the aliphatic nylon base. In one embodiment, the semiaromatic nylon is 6I/6T. The 6I/6T copolymer cannot be drawn into a fiber or filament by itself, but a blend with the aliphatic nylon can be drawn and processed readily.

The aliphatic nylon is present in the range of about 70-95% by weight of the blend. In another embodiment, the amount of aliphatic nylon is in the range of about 87-91% by weight. The semiaromatic nylon is present in the range of about 5-30% by weight of the blend. In another embodiment, the amount of semiaromatic nylon is in the range of about 9-13% by weight.

In some embodiments, the semiaromatic nylon has a melt temperature that is lower than the melt temperature of the aliphatic nylon. In some embodiments, the semiaromatic nylon has a glass transition temperature of from about 123° C. to about 153° C., and the aliphatic nylon has a glass transition temperature of from about 10° C. to about 65° C.

The nylon blend filament can also contain additives mixed in prior to or during extrusion, such as dyes, pigments, optical brighteners, stabilizers and mixtures thereof. There is no glass or carbon fiber in the nylon blend filament. The filament can have a diameter in the range of about 0.064 mm to about 1.0 mm. The filament can be oriented or partially oriented. In addition, the filament can have a draw ratio in the range of about 2.7 to about 9.

In some embodiments, the filament is subsequently suffused with electrically-conductive particles such as carbon to impart conductivity and further improve the properties of the filament, such as through the process described in U.S. Pat. No. 4,704,311 to Shakespeare Conductive Filaments, LLC. In that process, the solvent used to coat the filamentary polymer must be the same chemical species as the filamentary polymer itself, e.g., a nylon 6 filamentary polymeric substrate requires a nylon 6-based polymeric mix for the suffusion process, such as nylon 6 or nylon 66. However, the process described in the '311 patent had not been performed on blends of aliphatic and semiaromatic nylons, so it was unknown whether the process in the '311 patent would be applicable to such blends. Furthermore, the carbon suffusion process in the '311 patent relies on formic acid, which does not dissolve amorphous nylons, so it was unexpected to have significant success on the enhanced nylon blends described herein. Further still, the conductive fibers produced in the '311 patent were not analyzed for their physical properties, but the suffusion process described therein inherently reduces the physical properties of the filamentary substrate.

It has been unexpectedly discovered that suffusion has a positive effect on the mechanical properties of the enhanced nylon fibers; since carbon suffusion is a process involving both chemical and heat treatment that must be tuned to avoid destroying the structural integrity of the substrate, notably the unwinding tension of the filament, the mechanical properties of the nylon blend filament would be expected to decrease during carbon suffusion. Carbon suffusion is a coating process whereby solvent lightly etches the filament surface via dissolution, permitting the integration of carbon molecules into the filament surface. The coating process is affected by, among other things, the material composition and filament tension, both of which govern the critical dissolution time of the filament surface. "Critical dissolution time" is the time required for a filament to break when exposed to a solvent under a tension of 1 g/denier at 25° C. Typically, filament tension is set at 0.09 grams/denier during coating for Nylon 66. A higher tension results in faster etching. A filament tension greater than 0.4 g/denier is needed to retain higher tenacity and modulus for the enhanced nylon fibers.

In some embodiments, carbon can be substituted for another conducting media such as graphite, graphene, graphene based derivatives, and carbon nano tubes. The decision to recite "carbon," to the exclusion of other conducting media, is in the interest of brevity only and it is to be understood that another suitable conducting media may be used instead of carbon when "carbon" is described.

In some embodiments, the carbon suffused nylon filaments described herein have a higher initial modulus compared to conventional carbon suffused nylon filaments. For example, these carbon suffused filaments may behave like polyester in fabric construction processes, leading to improved integration into structures where higher modulus is desirable, such as fabrics formed predominantly from polyester.

In some embodiments, the carbon suffused filaments described herein have increased initial modulus, tenacity, and conductivity compared to commercially available polyester-based and nylon-based conductive filaments. In some embodiments, the filaments described herein have a tenacity of 6 gf/den or greater with 15% elongation at break. Furthermore, nylon-based filaments exhibit less wear and degradation than polyester.

As used herein, the "initial modulus", also known as the tensile modulus, refers to the stiffness of the fiber under normal loads, measured in terms of gram-force per denier (gf/den). The term is the "initial" modulus because it refers to the slope of the stress-strain curve of the fiber at the origin. A higher initial modulus generally relates to a stiffer fiber, while a lower initial modulus relates to a more flexible fiber. The initial modulus is calculated according to ASTM D2256.

As used herein, the "elongation at break" relates to the elongation experienced by the fiber before it breaks in terms of a percentage. The elongation at break are calculated according to ASTM D2256. The elongation at break may be calculated using Formula I:

$$\text{Elongation at break} = \frac{\text{length of fiber at break}}{\text{initial length of fiber}} \times 100\% \quad \text{Formula I}$$

As used herein, the "tenacity" refers to the strength of the fiber or filament and is related to the force required to rupture or break the fiber or filament, when pulled longitudinally, in terms of gram-force per denier (gf/den). Greater tenacity relates to stronger fibers. The tenacity is calculated according to ASTM D2256. The tenacity may be calculated using Formula II:

$$\text{Tenacity} = \frac{\text{load required to break specimen }(g)}{\text{linear density (denier)}} \times 100\% \quad \text{Formula II}$$

The initial modulus of commercial carbon suffused filaments is around 30% lower than the initial modulus of polyester fibers, while the initial modulus of the enhanced carbon suffused filaments as described herein is about 50 gf/den. Without intending to be bound by any particular theory, it is believed that conductive nylon having a low initial modulus compared to polyester fiber leads to paper machine fabric having a course or rough texture. This rough texture is prominent with smart apparel or apparel having sensors because these smart apparel contain higher level of conductive filaments produced from high modulus fibers comprising of carbon fibers or metal wire containing fibers. Thus, the higher conductivity and modulus achieved with the conductive filaments described herein is expected to have conductive filaments in plane with fabric, translating to a lower roughness. This in turn is useful for smart apparel in detecting body temperature and sweat they have properties matching those of common polyester-based continuous apparel yarns for producing fabrics with comparable wear, comfort and washability.

EXAMPLES

The present disclosure may be further understood with reference to the following non-limiting examples.

Example 1: Comparison of Properties Between Commercially Available Conductive Filaments, Non-Conductive PET Filaments, and the Conductive Filaments of the Present Invention Enhanced carbon suffused nylon filaments were produced as described herein. The tenacity (gram-force/denier), elongation at break (%), initial modulus (gram-force/denier), and linear surface electrical conductivity/resistivity (kΩ/cm) were measured and compared to a polyester-based conductive filament; Sanstat®, a carbon suffused nylon available commercially from Shakespeare Company, LLC., Greer, South Carolina, U.S.A.; Resistat®, a carbon suffused nylon available commercially from Shakespeare Company, LLC., Greer, South Caroline, U.S.A.; Belltron®, a bi-conductive nylon available commercially from Aramid HPM, LLC, Hilton Head, South Carolina, U.S.A.; and No-Shock®, a bi-conductive nylon available commercially from Ascend Performance Materials, Houston, Texas, U.S.A.. The electrical conductivity and resistivity are inversely related. The results are presented in Table 1.

The linear surface electrical resistivity of conductive filaments was measured using two ⅜ inch stainless steel posts positioned 10 cm apart on a polyvinyl chloride (PVC) board. The bottom of each steel post was connected to a multi-meter. Conductive filament was removed from a spool and threaded between the two posts, with one end of the filament wrapped once around one post, and the other end of the filament wrapped once around the other post. Slight tension was applied during wrapping so that the filament was taut without mechanically stretching the filament. The multi-meter was configured to display the resistivity in kΩ/10 cm, which was divided by 10 to provide the resistivity in kΩ/cm as shown in Table 1.

Similarly, a variety of non-conductive PET filaments common in apparel and industrial fabrics were tested for their tenacity (gram-force/denier), elongation at break (%), initial modulus (gram-force/denier), and electrical conductivity/resistivity (kΩ/cm). The samples tested are detailed in Table 2. The results of the tests are presented in Table 3.

TABLE 2

| PET Samples Tested | |
| --- | --- |
| Sample I.D. | Type of PET |
| A | High tenacity PET fiber for High performance apparels, carpets and non-wovens interiors |
| B | PET filament used for Industrial Belt application (Shakespeare ® WP775) |
| C | PET filament used for Engineered fabric (Shakespeare ® WP500) |
| D | High tenacity PET filament for conveyor and processing belts (Diolen ® 174S) |
| E | High tenacity PET for luggage applications |
| F | High tenacity PET filament for apparel applications |

TABLE 1

Comparison of properties between commercially available conductive filaments, non-conductive PET filaments, and the conductive filaments of the present invention

| Properties | Polyester-based Bi-Co conductive filament | Carbon suffused nylon (Sanstat ®) | Carbon suffused nylon (Resistat ®) | Nylon based Bi-Co fiber (Belltron ®) | Nylon based Bi-Co fiber (No-Shock ®) | Enhanced carbon suffused nylon |
| --- | --- | --- | --- | --- | --- | --- |
| Filament size (mm) | 0.50 | 0.50 | 0.04 | 0.046 | 0.03 | 0.50 |
| Tenacity (gf/den) | 3.4 | 4.2 | 3 | 3.5 | 3.8 | 6.45 |
| Elongation at break (%) | 22 | 23 | 15 | 50 | 65 | 23 |
| Initial Modulus (gf/den) | 62 | 36 | Unknown | Unknown | Unknown | 51 |
| Electrical Resistivity (kΩ/cm) | 830 | 3.9 | 4 | $10^4$ | $3.5 \times 10^4$ | 3.45 |

TABLE 3

Typical matrix yarns and filaments in industrial fabrics and high-performance apparel

| Sample | A | B | C | D | E | F |
|---|---|---|---|---|---|---|
| Filament size (mm) | 0.012 | 0.40 | 0.50 | 0.026 | 0.017 | 0.19 |
| Tenacity (gf/den) | 5.0 | 5.5 | 4.2 | >7 | 6.2 | 6.2 |
| Elongation at break (%) | 30 | 35 | 45 | 20 | 8 | 22 |
| Initial Modulus (gf/den) | Unknown | 75 | 70 | Unknown | Unknown | Unknown |

As shown in Tables 1-3, the enhanced carbon suffused nylon of the present invention has greater tenacity and higher electrical conductivity than commercially available carbon suffused nylon or polyester-based conductive filaments, or standard PET filaments, while having comparable elongation at break and initial modulus. The enhanced carbon suffused nylon is more than 200 times more conductive than polyester-based conductive filaments. Higher conductivity allows for use of lower number of filaments in a fabric to maintain overall surface resistivity specification.

Example 2: Production of Enhanced Nylon Filaments

Samples of enhanced nylon were produced as described herein. Monofilament samples having a diameter of 0.5 mm were prepared using standard monofilament line with a 2 inch single-screw extruder equipped with a water-filled quench tank and three ovens and draw godets. These monofilament samples were used as feed yarn for the suffusion process. Three resins were used to prepare the filaments: a high viscosity nylon 66 having a relative viscosity between 100 and 140, as measured by ASTM D789; CR149HI, available commercially from Shakespeare Company, LLC, Greer, South Carolina, U.S.A., which is a high-viscosity nylon 6I/6T copolymer with Sulfuric Acid Viscosity (SAV) number between 1.4 and 1.6, measured according to ISO 307; and SVPx-142 Novadyn™, which is a high viscosity nylon DT/DI copolymer available commercially from Shakespeare Company, LLC, Greer, South Carolina, U.S.A., with SAV number between 1.4 and 1.7, measured according to ISO 307. Nylon DT/DI has a glass transition temperature (Tg) of about 151° C., dry nylon 66 has a Tg of about 65° C., and wet nylon 66 has a Tg of about 10° C. These filaments were compared against PET-based conductive filaments. The processing conditions for all samples were set to achieve stable processable conditions with the highest level of filament orientation possible without experiencing draw breaks. The overall maximum draw ratio ranges between 4.2 and 5.6 by targeting a residual shrinkage between 5% and 7% as measured using ASTM D2259. Tenacity, elongation at break, and initial modulus are determined according to ASTM D2256. The processing parameters are presented in Table 4, and the properties of the resulting nylons are presented in Table 5.

TABLE 4

Extrusion Parameters for Nylon Filament Samples A-E

| Process Conditions | Sample A (Control) | Sample B | Sample C | Sample D | Sample E |
|---|---|---|---|---|---|
| High Viscosity Nylon 66 | 100% | 90% | 85% | 90% | 85% |
| Amorphous Nylon | None | 10% Nylon 6I/6T CR149HI | 15% Nylon 6I/6T CR149HI | 10% Nylon DT/DI SVPx-142 Novadyn™ | 15% Nylon DT/DI SVPx-142 Novadyn™ |
| Polymer melt tempt at extruder exit (° C.) | 278 | 278 | 278 | 278 | 278 |
| Quench Temp (° C.) | 32 | 32 | 32 | 32 | 32 |
| Max Draw ratio | 4.2 | 4.2 | 5.2 | 5.2 | 5.6 |
| Oven 1 temp (° C.) | 135 | 135 | 169 | 181 | 181 |
| Oven 2 temp (° C.) | 171 | 171 | 182 | 182 | 188 |
| Oven 3 temp (° C.) | 179 | 179 | 221 | 207 | 218 |

TABLE 5

Physical Properties of Nylon Filament Samples A-E

| Property | Sample A (Control) | Sample B | Sample C | Sample D | Sample E |
|---|---|---|---|---|---|
| Diameter (mm) | 0.50 | 0.50 | 0.50 | 0.50 | 0.50 |
| Tenacity (gf/den) | 4.6 | 4.5 | 6.7 | 7.1 | 7.0 |
| Elongation at break (%) | 23 | 24 | 22 | 24 | 21 |
| Initial Modulus (gf/den) | 43.3 | 44 | 51.7 | 50.3 | 51.5 |
| Hot Air Shrinkage at 177° C. (%) | 5.2 | 6.8 | 6.8 | 6.5 | 7.3 |

As shown in Table 3, the tenacity of Samples C, D, and E were enhanced 45-75% over the control sample. Sample B did not have significant changes in physical properties over the control and was unable to be drawn appreciably more without experiencing draw breaks. Sample D, which comprises 10% DT/DI showed significant changes in physical properties despite no changes in elongation at break. Sample E, which comprises 15% DT/DI, performed similar to Sample D despite 50% more DT/DI, indicating an apparent maximum to the amount of DT/DI required to realize improvements in physical properties for this particular filament size. Furthermore, the improved physical properties were achieved with 10% DT/DI (Sample D), or 15% 6I/6T (Sample C), indicating that DT/DI is more effective in realizing enhanced properties as it required a lower concentration. Thus, only Samples A (control), C, and D were selected for subsequent processing via carbon suffusion.

Since Samples C and D have such high tenacity, incorporation of these filaments into fabric structures reduce or eliminate plane differences that typically result from the low-tenacity PET-based conductive filaments. Since these plane differences manifest in the form of crimp knuckles in the fabric, incorporation of Samples C or D result in conductive filaments in plane with fabric to form a uniform, smooth fabric surface. These nylon-based samples are also 12-22% lighter than PET-based Sample A, reducing the weight of the final fabric structure and the cost of manufacturing.

Example 3: Conditioning and Carbon Suffusion of Nylon Filaments

Samples A, C, and D from Example 2 were conditioned and suffused with carbon. Carbon suffused samples were processed as described herein and in U.S. Pat. No. 4,704,311. The, tenacity, and initial modulus for each sample was tested (i) after extrusion (dry), (ii), after dry conditioning, (iii) after wet conditioning, and (iv) after carbon suffusion. Dry conditioned samples were reeled on a denier wheel with 45 rounds and conditioned at 22-25° C. and 65-72% relative humidity for 48 hours. Wet conditioned samples were reeled on a denier wheel with 45 rounds, submerged in water for 4 days, then removed from water and allowed to dry for 2 days in the lab with no external heat. The tenacity results are presented in Table 6, and the initial modulus results are presented in Table 7.

TABLE 6

Tenacity Results

|  | Sample A (Control) | Sample C | Sample D |
|---|---|---|---|
| Dry Tenacity (gf/den) | 4.4 | 6.6 | 7 |
| Dry Conditioned Tenacity (gf/den) | 4.2 | 6.1 | 6 |
| Wet Conditioned Tenacity (gf/gen) | 4.0 | 6.0 | 6.1 |
| Carbon Suffused Tenacity (gf/den) | 4.2 | 6.4 | 6.5 |

TABLE 7

Initial Modulus Results

|  | Sample A (Control) | Sample C | Sample D |
|---|---|---|---|
| Dry Modulus (gf/den) | 42 | 54 | 53 |
| Dry Conditioned Modulus (gf/den) | 30 | 48 | 47 |
| Wet Conditioned Modulus (gf/den) | 24 | 33 | 36 |
| Carbon Suffused Modulus (gf/den) | 36 | 52 | 50 |

Example 4: Comparison of Carbon Suffused Nylon Filament Properties after One Year The Carbon Suffused Samples from Example 3 were aged for one year and tested for the effect of humidity and water saturation on the denier, breaking force, tenacity, elongation at break, and initial modulus. After one year, these samples were conditioned in one of three ways: "lab" conditioned samples were subjected to a temperature of 22-25° C. and relative humidity of 52-55% for 48 hours; "humid" conditioned samples were subjected to a temperature of 22-25° C. and relative humidity of greater than 90% for 48 hours; and "wet" conditioned samples were immersed in water having a temperature of 22-25° C. and for 48 hours, then removed from water and allowed to dry for 2 days in the lab with no external heat. The results are presented in Table 8.

TABLE 8

Properties of Carbon Suffused Nylon Filaments after One Year

| Sample | Sample A (Control) | | | Sample C | | | Sample D | | |
|---|---|---|---|---|---|---|---|---|---|
| Conditioning | Lab | Humid | Wet | Lab | Humid | Wet | Lab | Humid | Wet |
| Change in Denier (%) | 0 | +4.0 | +28 | 0 | +2.0 | +43 | 0 | +4.0 | +38 |
| Tenacity (gf/den) | 4.1 | 3.6 | 2.7 | 6.4 | 5.7 | 3.9 | 6.5 | 5.8 | 4.2 |
| Elongation at break (%) | 24 | 30 | 30 | 22 | 24 | 23 | 22 | 24 | 24 |
| Initial Modulus (gf/den) | 37 | 15 | 10 | 51 | 23 | 11 | 50 | 22 | 12 |

As shown in Table 9, all nylon filaments experience a reduction in tenacity when wet. This is observed with both control (A) and enhanced samples (C and D). However, the enhanced samples unexpectedly remain near the level of lab conditioned control despite being wet. This is very important in designing industrial fabrics which go through both wet and dry cycles or fabrics with both PET and nylon filaments where nylon and PET experience different level of tenacity drop. Since, the tenacity of the samples produced as described herein was retained after aging for one year, the filament is considered stable.

Example 5: Production of 0.4 mm Enhanced Nylon Filaments

Samples of enhanced nylon were produced as described herein. Monofilament samples having a diameter of 0.4 mm were prepared using standard monofilament line with a 2 inch single-screw extruder equipped with a water-filled quench tank and three ovens and draw godets. These monofilament samples were used as feed yarn for the suffusion process. Two resins were used to prepare the filaments: a high viscosity nylon 66 with a relative viscosity between 100 and 140, as measured by ASTM D789; and SVPx-142 Novadyn™, a high viscosity nylon DT/DI copolymer available commercially from Shakespeare Company, LLC, Greer, South Carolina, USA, with an SAV number between 1.4 and 1.7, as measured by ISO 307. The processing conditions for all samples were set to achieve stable processable conditions with the highest level of filament orientation possible without experiencing draw breaks. A residual shrinkage between 2% and 4% was targeted by controlling the temperature of ovens 2 and 3, as measured according to ASTM D2259, and the maximum draw ratio ranges between 4.2 and 5.5. The processing parameters are presented in Table 9, and the properties of the resulting nylons are presented in Table 10.

TABLE 9

Extrusion Parameters for Nylon Filament Samples M and N

| Process Conditions | Sample M (Control) | Sample N |
| --- | --- | --- |
| High Viscosity Nylon 66 | 100% | 90% |
| Amorphous Nylon | None | 10% Nylon DT/DI SVPx-142, Novadyn ™ |
| Polymer melt tempt at extruder exit (° C.) | 278 | 278 |
| Quench Temp (° C.) | 32 | 32 |
| Max Draw ratio | 4.2 | 5.4 |
| Oven 1 temp (° C.) | 149 | 204 |
| Oven 2 temp (° C.) | 182 | 238 |
| Oven 3 temp (° C.) | 227 | 271 |

TABLE 10

Physical Properties of Nylon Filament Samples M and N

| Property | Sample M (Control) | Sample N |
| --- | --- | --- |
| Diameter (mm) | 0.40 | 0.40 |
| Tenacity (gf/den) | 5.2 | 7.6 |
| Elongation at break (%) | 27 | 21 |
| Initial Modulus (gf/den) | 48 | 62 |
| Hot Air Shrinkage at 177° C. (%) | 2.9 | 3.0 |

As shown in Table 10, Sample N has the highest tenacity and a higher modulus than the samples with diameter of 0.50 mm in Example 4.

Example 6: Conditioning and Carbon Suffusion of Nylon Filaments

Samples M and N from Example 5 were conditioned and suffused with carbon. The samples were conditioned at 22-25° F. and 65-72% relative humidity for 48 hours. The samples were then suffused with carbon as described herein and in U.S. Pat. No. 4,704,311. The effects of both conditioning and carbon suffusion on the initial modulus are presented in Table 11.

TABLE 11

Effect of Conditioning and Carbon Suffusion on Initial Modulus

| | Sample M (Control) | Suffused Sample M (Control) | Sample N | Suffused Sample N |
| --- | --- | --- | --- | --- |
| Initial Modulus (before conditioning) (gf/den) | 47 | 39 | 63 | 63 |
| Initial Modulus (after conditioning) (gf/den) | 28 | 27 | 54 | 49 |

As shown in Table 11, the initial modulus before conditioning for Sample M dropped 17% after suffusion, but no drop was observed for Sample N after suffusion. The initial modulus after conditioning Sample N after suffusion was 181% greater than the initial modulus after conditioning for suffused Sample M. Furthermore, suffused Sample N after conditioning retained 78% of its initial modulus, compared to only 69% for suffused sample M.

Example 7: Effect of Relative Humidity on Modulus of Enhanced Nylon Filaments Samples M and N from Example 6, before carbon suffusion, were subjected to varying levels of relative humidity to determine the effect of increasing relative humidity on the modulus. The results are displayed in FIG. 1. As shown in FIG. 1, the modulus decreases with increasing relative humidity for both Samples M and N, but Sample M experiences much greater degradation in the modulus with increasing relative humidity. The presence of DT/DI in the suffused filament retards modulus loss when wet.

While the disclosure has been described with reference to a number of embodiments, it will be understood by those skilled in the art that the disclosure is not limited to such embodiments. Rather, the disclosure can be modified to incorporate any number of variations, alterations, substitutions, or equivalent arrangements not described herein, but which are commensurate with the spirt and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure it not to be seen as limited by the foregoing described, but is only limited by the scope of the appended claims.

That which is claimed is:

1. A filament comprising:
   a blend of an aliphatic nylon, a semiaromatic nylon, and optionally one or more additives, wherein the aliphatic nylon comprises about 70-95% by weight of the blend and the semiaromatic nylon comprises about 5-30% by weight of the blend, and
   electrically conductive particles suffused into a surface of the filament.

2. The filament of claim 1, wherein the aliphatic nylon is selected from Nylon 6, Nylon 66, copolymers rich in Nylon 6 or Nylon 66, and mixtures thereof.

3. The filament of claim 1, wherein the semiaromatic nylon is selected from 6I/6T copolymer, 6T/6I copolymer, DT/DI copolymer, and a mixture thereof.

4. The filament of claim 3, wherein semiaromatic nylon has a melt temperature that is lower than a melt temperature of the aliphatic nylon.

5. The filament of claim 1, wherein the semiaromatic nylon has a glass transition temperature from 123° C. to 153° C.

6. The filament of claim 1, wherein the aliphatic nylon has a glass transition temperature from 10° C. to 65° C.

7. The filament of claim 1, wherein the one or more additives are selected from dyes, pigments, optical brighteners, and stabilizers.

8. The filament of claim 1, wherein the electrically conductive particles comprise carbon.

9. The filament of claim 1, wherein the filament has a tenacity of at least 6 gf/den with 15% elongation at break.

10. The filament of claim 1, wherein the filament has a linear surface electrical resistivity of less than 4 kΩ/cm.

11. The filament of claim 1, wherein the filament has an initial modulus of at least 45 gf/den.

12. A filament comprising:
    a blend of an aliphatic nylon, a semiaromatic nylon, and optionally one or more additives, wherein the aliphatic nylon comprises about 75-90% by weight of the blend and the semiaromatic nylon comprises about 10-25% by weight of the blend, and
    electrically conductive particles suffused into a surface of the filament,
    wherein the filament has a linear surface electrical resistivity of less than 4 kΩ/cm, and
    wherein the filament has an initial modulus of at least 45 gf/den.

* * * * *